Figure 1:
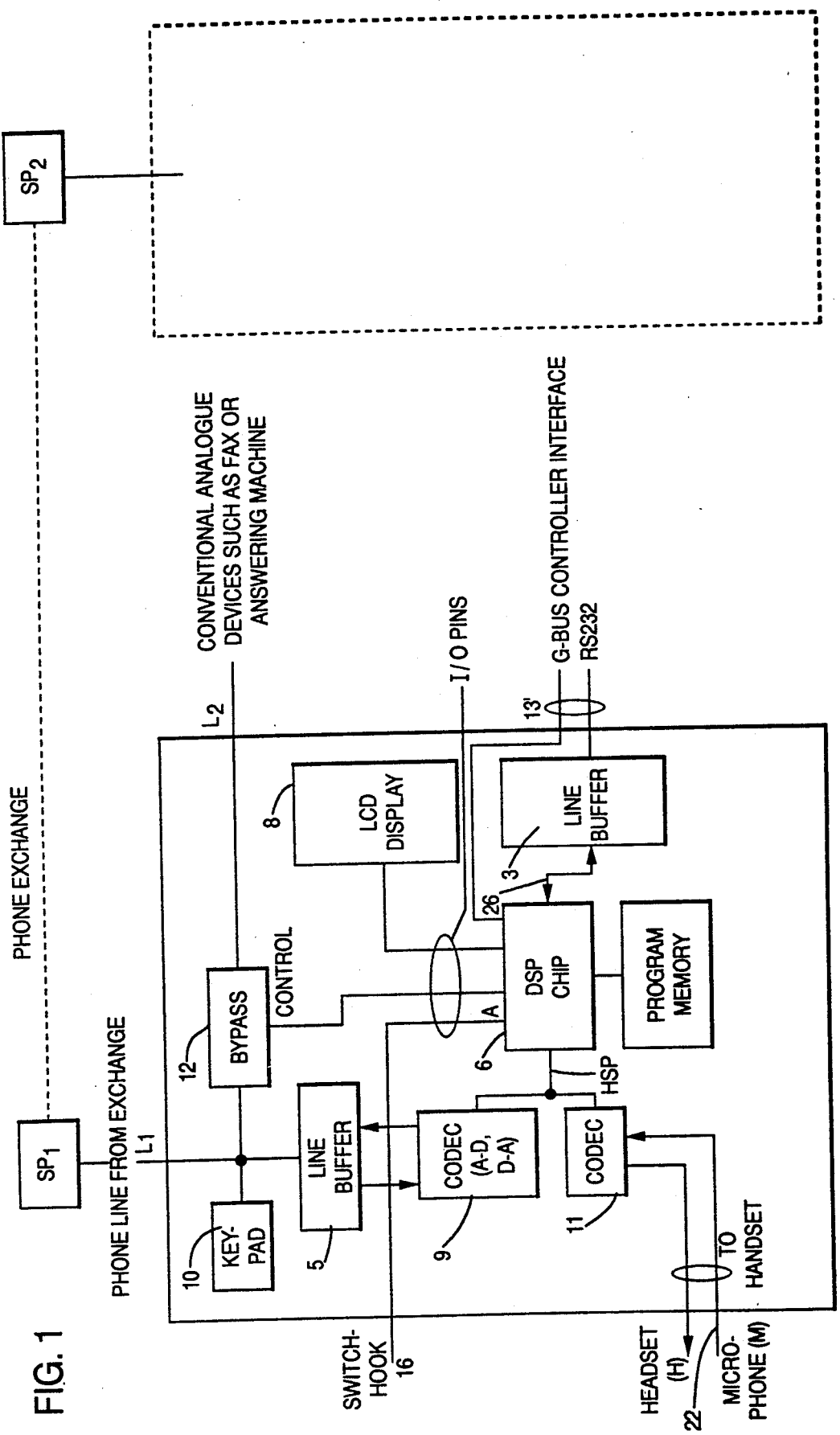

United States Patent [19]

Greenblatt

[11] Patent Number: 5,036,513

[45] Date of Patent: Jul. 30, 1991

[54] METHOD OF AND APPARATUS FOR INTEGRATED VOICE (AUDIO) COMMUNICATION SIMULTANEOUSLY WITH "UNDER VOICE" USER-TRANSPARENT DIGITAL DATA BETWEEN TELEPHONE INSTRUMENTS

[75] Inventor: Richard D. Greenblatt, Cambridge, Mass.

[73] Assignee: Academy of Applied Science, Concord, N.H.

[21] Appl. No.: 369,704

[22] Filed: Jun. 21, 1989

[51] Int. Cl.$^5$ .......................................... H04M 11/06
[52] U.S. Cl. .................... 370/125; 370/69.1; 370/76; 370/110.1; 370/110.4; 358/85; 379/53; 379/54; 379/96
[58] Field of Search .................. 370/125, 70, 76, 69.1, 370/110.1, 110.4, 118, 95.2; 358/85; 379/53, 54, 80, 88, 89, 93, 96, 100, 194, 195, 197, 198, 245, 247

[56] References Cited

U.S. PATENT DOCUMENTS

| | | | |
|---|---|---|---|
| 4,425,661 | 1/1984 | Moses et al. | 370/110.4 |
| 4,442,540 | 4/1984 | Allen | 370/70 |
| 4,479,213 | 10/1984 | Galand et al. | 370/118 |
| 4,560,833 | 12/1985 | Weber et al. | 379/53 |
| 4,794,639 | 12/1988 | Urui et al. | 379/96 |
| 4,849,811 | 7/1989 | Kleinerman | 379/53 |
| 4,903,262 | 2/1990 | Dissosway et al. | 370/95.2 |
| 4,908,851 | 3/1990 | Kotani et al. | 379/96 |

FOREIGN PATENT DOCUMENTS

| | | | |
|---|---|---|---|
| 0054052 | 3/1988 | Japan | 379/53 |
| 0175452 | 7/1989 | Japan | 358/85 |

OTHER PUBLICATIONS

AT & T Technical Journal, Jan.-Feb. 1986, vol. 65, Issue 1.
Motorola Semiconductor Technical Data DSP56001, "56-Bit General Purpose Digital Signal Processor", 1988, pp. 1–60.
International Telecommunication Union Red Book, "Data Communication Over the Telephone Network", Geneva 1985, pp. 64–93, 203–214, 221–238.

*Primary Examiner*—Douglas W. Olms
*Assistant Examiner*—Alpus H. Hsu
*Attorney, Agent, or Firm*—Rines and Rines

[57] ABSTRACT

A novel method of and apparatus for voice communication and transparent, non-interfering, automatic digital data exchange between appropriately equipped telephone terminals having cooperative digital signal processing and visual display equipment, using special recognition signal protocol triggering signals and providing modem capability for FAX, printer, microprocessor, answer machines and the like for providing extended services using in-band signalling sensible by users and machines. Such method is useful both with ordinary telephone exchanges and ISDN type exchanges.

16 Claims, 2 Drawing Sheets ated only from the point of view of the telephone
METHOD OF AND APPARATUS FOR INTEGRATED VOICE (AUDIO) COMMUNICATION SIMULTANEOUSLY WITH "UNDER VOICE" USER-TRANSPARENT DIGITAL DATA BETWEEN TELEPHONE INSTRUMENTS The present invention relates to telephone communication systems and methods, being more particularly concerned with integrated audio and multi-format data terminal communication between a pair of suitably equipped telephone instruments, with the users conversing in normal fashion while alpha-numeric data is exchanged as between machines, such as computers, fax machines, displays as of the LED type, etc., all smoothly and, if desired, with user transparency (i.e., without knowledge or awareness of the users).

BACKGROUND

Present-day advances in telephony, while sometimes referred to as "integrated systems", are actually "integrated" only from the point of view of the telephone network and in the limited sense that digital and analog signals are switched by much common equipment; but from the user's point of view, there is little or no integration in that there is a telephone either for voice communication, or for a data call or connecting a computer in a particular way similar to ordinary modem connections. The ISDN system (Integrated Services Digital Network) of AT&T, for example, as described in AT&T Technical Journal, January-February, 1986, Vol. 65, Issue 1, in conjunction with the AT&T Mode 7506 ISDN telephone handset, selectively operates multiple phones, including with LCD display to show the number being dialed and/or the number calling the telephone (so-called ANI or automatic number identification) and, through an RS232 connector at the back of the phone, enables the plugging in of one or more modems to enable data transmission totally independent of the communication use of the telephone. No simultaneity of voice communication and data exchange to a single telephone number is possible, let alone with user transparency. On any given phone call, the operation either is just exactly like a phone having no computer or other data equipment whatsoever, or it is a computer operation exactly like a modem having no audio phone conversation use whatsoever. If the user does not possess a computer or a data terminal, then the user has no means whatsoever to do anything beyond a normal phone connection with this system. Thus, there is nothing "integrated" in these systems from the user's point of view.

Underlying the present invention, however, is a very different philosophy that achieves simultaneously both the function of conducting conversation and effecting digital transfer of information (such as computer-computer data exchange, FAX transmission, etc.). Currently, the mode of exchange (audio, computer data, FAX data, etc.) is usually implicit in the telephone number being dialed; some numbers are FAX numbers, for example, and some computer numbers. By means of the present invention, however, a number of these services are handled by a single telephone number; automatically and without confusion, and with providing entirely new services as well. Particularly interesting are those which combine audio conversation with data transmission simultaneously.

To initiate such a service smoothly and to achieve automatic coordination of extended telephone services sensible by both humans and machines, it is essential that the equipment at both ends of the line and the conversing users be informed of the fact that the telephones are equipped for specialized services that are to be provided. This is achieved, in accordance with the invention, by the use of a particular signal, called the SMARTPHONE ™ RECOGNITION SIGNAL (SRS) which serves as the basis for much of this automatic recognition and mode selection. Briefly, an SRS is a particular in-band, complex, time-varying unique or distinctive audio signal, chosen with regard to a number of criteria later described. Once such an SRS has been transmitted, recognized, and responded to, all parties on the line (whether human user or machine) are aware that this is as SRS-equipped call. They are then ready to exchange further signals, if necessary, which can select a number of features and transmission modes as desired. The use of a later-discussed Digital Signal Processor (DSP), such as the Texas Instruments TMS320 series or Motorola DSP56000 series, as described in the Motorola technical data bulletin DSP56001, 1988 (pages 1–60), is a convenient means to make effective use of the flexibility made possible by the invention.

OBJECTS OF INVENTION

An object of the invention, accordingly, is to provide a new and improved method of and apparatus for integrated voice (audio) communication simultaneously with "under voice" user-transparent digital data exchange between telephone instruments. By the term "under voice", as used herein, it is intended generically to embrace the concept of absence of noticeable interference with the voice communication, including, but not limited to, the use for data transmission of frequency bands below or above the voice channel and signal compression techniques, and alternatively by converting the voice to digital form as by a vocoder-type system and integrating with digital data.

Other and further objects will be explained hereinafter and are more particularly defined in the appended claims.

SUMMARY

In summary, however, from one of its viewpoints, the invention embraces a method of voice and simultaneous user-transparent digital data communication between a pair of telephones connectable through an ordinary telephone exchange, that comprises, providing each telephone with special cooperative digital processing and visual digital display capability; programming the processing (1) to transmit a distinctive audio recognition signal from the receiving telephone when connected to the calling telephone and from the calling telephone back to the receiving telephone to indicate to the users that both phones are specially equipped for cooperation, and (2) to transmit such recognition signal between the calling and receiving telephone digital processing equipments; causing the visual display of the calling telephone to display digital data originating from the programming in the receiving telephone processing and digitally transmitted "under voice" therefrom in a manner and protocol transparent or imperceptible to the telephone users and during their continued voice conversation. The invention also provides substantial advantage with the before-mentioned ISDN type telephone exchange system as will hereinafter be explained. Preferred and best mode embodiments and details are later presented.

DRAWINGS

Figure 2:
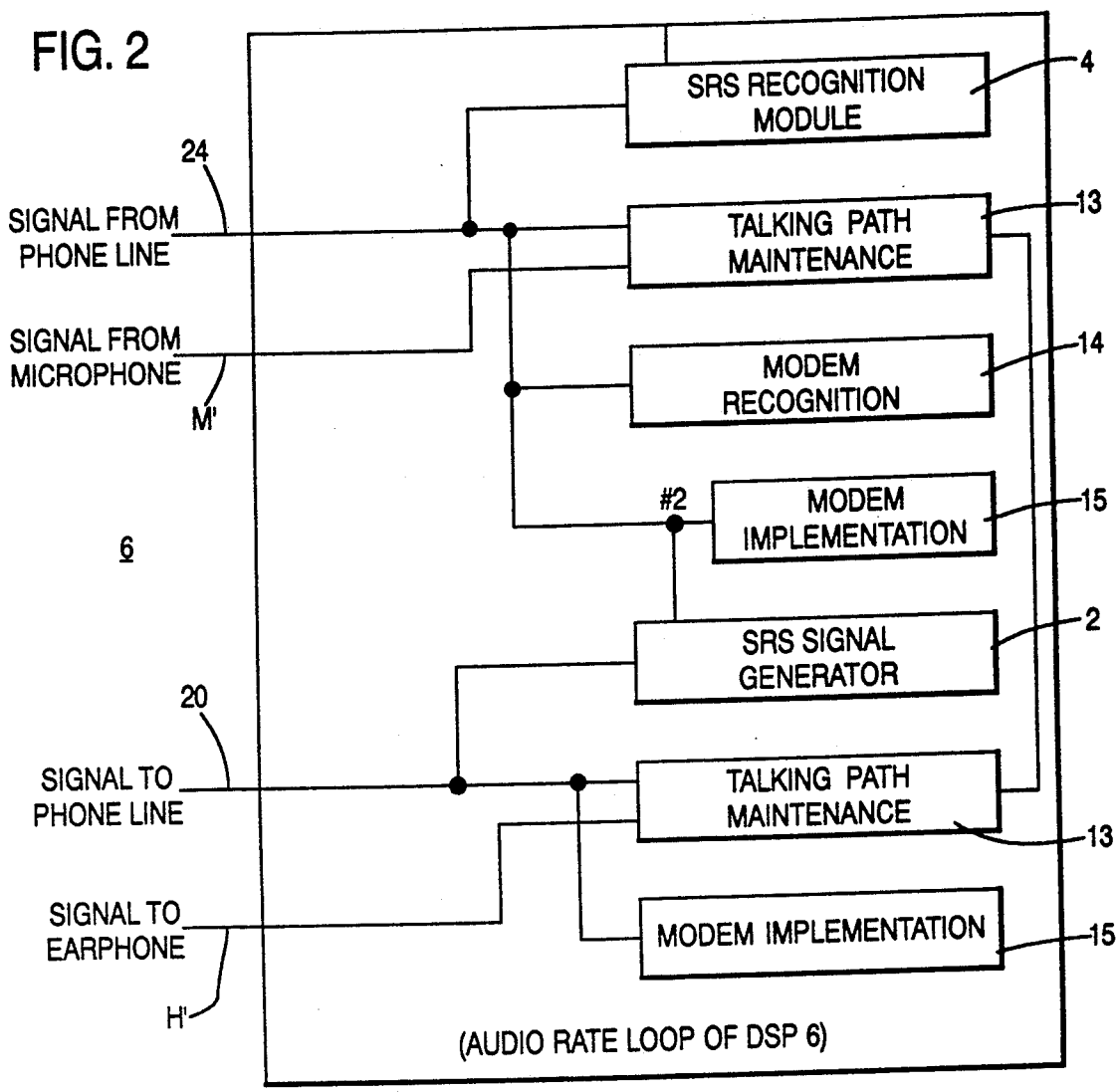
Figure 3:
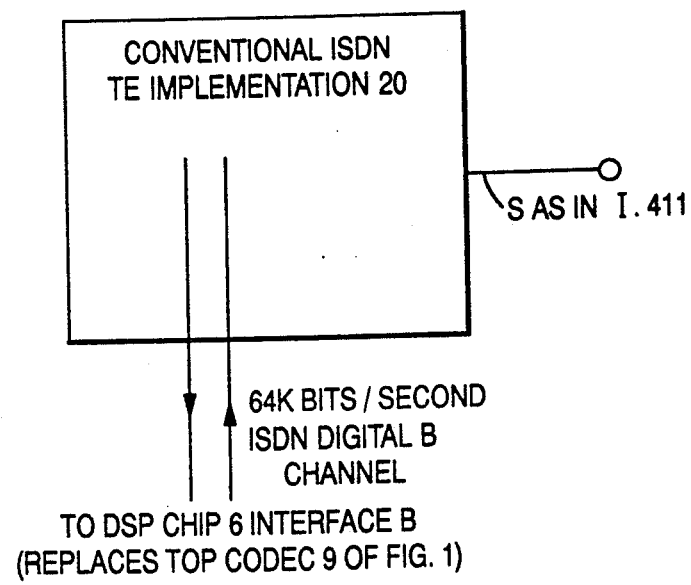

The invention will now be described with reference to the accompanying drawings, FIG. 1 of which is a block and circuit diagram of a preferred embodiment which may provide all these features in a form factor compatible from both physical and electrical points of view with an ordinary conventional telephone;

FIG. 2 is a similar diagram illustrating details of the digital processing systems incorporated into the phones of FIG. 1; and FIG. 3 is a block diagram showing the incorporation of the invention in an ISDN type telephone exchange.

DESCRIPTION

Referring to the drawing, a pair of telephones equipped in accordance with the invention and conventionally connected by a telephone exchange is shown in FiG. 1 at $SP_1$, and $SP_2$. Each instrument terminal is provided with a means 2 FIG. 2, for generating the SRS signal and a filter means 4 for recognizing the same, both to produce a distinctive audible alerting signal to the user and to enable the digital data exchange apparatus associated with the terminal to recognize the same. Criteria involved in choosing an appropriate SRS include at least the following;

(1) Pleasing and distinctive sound to humans;

(2) Ease of detection by machine (typically a DSP);

(3) Minimal probability of confusion with signals occurring during ordinary speech or other modes of operation;

(4) Reasonable duration; long enough to be easily distinguishable but not so long as to cause excessive line occupancy;

(5) Minimal probability of the SRS itself being confused by ordinary equipment with signals present early in the call in any conventional operational mode.

For example, if an ordinary FAX call is made with such an SRS telephone apparatus, it is undesirable that an SRS signal be interpreted by the FAX modem as a FAX modem answer signal. The exact considerations here depend on conventions adopted as to which party (calling, called, or both) transmits SRS signals, what are considered to be triggering events (line polarity reversal, etc.), and what time delays are employed. Some flexibility in these regards may be built into the equipment, so as to enable operation with whatever conventional equipment might be encountered.

The timeline of a typical call using SRS equipment at both ends might look like this:

(1) The user at $SP_1$ dials the number at keyboard 10, FIG. 1, in the usual fashion and connection is made through the "PHONE EXCHANGE" to the receiving phone $SP_2$;

(2) The called phone $SP_2$ answers and immediately sends an SRS by the generator 2 in its DSP chip 6, FIG. 2, along the "SIGNAL TO PHONE LINE" path 20, ultimately back to calling phone $SP_1$ as later explained;

(3) The calling phone $SP_1$ detects the SRS at later-referenced recognition module 4, FIG. 2, and replies with an SRS reply from its SRS signal generator 2 in its DSP chip 6. The SRS reply may be a signal distinct from the original SRS, although this is not absolutely necessary.

(4) The called phone $SP_2$ recognizes the SRS reply in its recognition module 4, FIG. 2.

At this point, the equipment at both ends is aware that appropriately equipped SRS terminals are in use and that they are ready to exchange further signals according to a particular protocol which corresponds with the particular SRS which has been exchanged. Furthermore, any humans listening in on the line have heard the distinctive SRS signal and are aware of this situation. This has been done in a fully compatible manner, in that no special directory number or other action was required. This scheme does not interfere with the provision of ordinary services by ordinary equipment without change (provided the SRS has been chosen properly). Developments from this point depend on the protocol adopted.

Typical services which might be selected include:

Transmission of alpha-numeric data simultaneously with ordinary conversation. This data might appear on an LCD display 8, FIG. 1, so as to be visible to the user while the conversation takes place. This would be particularly valuable in the case of travel reservations, appointments, etc..

Further exchange of configuration information can take place, in either a machine-to-machine or machine-to-machine-and-human mode. Useful information to exchange might include: the existence and size of LCD displays; available computer connections and baud rates; transmission standards supported; existence of FAX capability; ability to support demultiplexing protocols; availability of specific devices such as printers and authentication modules.

Each of the telephone terminals $SP_1$, $SP_2$, etc. that is to communicate in accordance with the invention is provided with special digital signal processing equipment (DSP), above-mentioned, and display equipment, such as LCD display(s), and optionally with auxiliary computer, FAX, message recording, printing and other facilities, the existence of which will be communicated between the user phone terminals as available for use.

In accordance with this invention, a user can dial all the same numbers normally dialled and in the normal way. The user doesn't have to push any additional buttons or even be aware of the existence of this device or treat it in any way any differently than the user of an ordinary voice communications telephone. However, if it so happens that the number dialled is a facility that is also fitted out with a "smart" phone, then a number of additional features may be triggered and these are triggered in a smooth, transparent way without the user being aware of the same, though another important feature of the system is that the triggering may also, if desired, be made apparent to the user.

One of the interesting features residing in the provision of an LCD display on the SBS-equipped phone is that, with the appropriate equipment at the far end of the connection, data can then be transferred back to the user to show up on this LCD display, rather than having to pass that information over the audio channel at all. And the user may, while this is going on, continue to talk in the normal way of using the telephone without intrusion ("under voice"). Conceptually, within this phone box, a number of modules are provided to effect the above-described functions—some of them being the ordinary phone analog such as, for example, the headset H, FIG. 1, and the line conditioning electronics. As previously mentioned, a digital signalling processing module is employed having within it the digital signal processing chip 6 itself which as previously stated may be a Motorola 56001 with ordinary EIA serial ports connected with an RS 232 type of interface, so-labelled. Also within the phone, earlier described LCD display 8 is provided, interfaced with the DSP chip 6. Alternatively, the implementation of this type of control may be effected with a separate computer on the order of an 8751 Intel single chip computer supplemental to the DSP chip 6, dependent upon how much memory is needed, etc.—such serving as the hardware that would be required to implement the various data exchange and reproduction functions. The conventional touch tone dial, hook switch and other conventional parts of an ordinary phone $SP_1$, of course, interface to the DSP chip 6 as later more fully discussed. The digital signal processing chip 6 implements the SRS recognition filter 4 in software, FIG. 2, with the incoming data in digitized form being applied to this filter continuously at a certain sample rate of some thousands of times per second. The output of the filter 4 is zero most of the time; but if this particular SRS signal comes along, then it is recognized and the output becomes "one". The digital processing chip 6 also implements the SRS generator—again through software. Basically when the logic of the program dictates that it is time to apply this signal, it adds the SRS signal to the outgoing digital signal which is then converted to analog by the upper "codec" 9 (coder-decoder), FIG. 1. The codec may be of the serial 13 - bit linear type (A/D & D/A—analog-to-digital and digital-to-analog) such as the Motorola MC145402 described in its Sept. 23, 1987, technical data bulletin.

Typically there are several design choices possible. Let it be assumed, for example, that it is desired to digitize the headset H as by using the lower codec 11, FIG. 1, designed to perform this function and to interface in a very clean way to the digital processing chip 6. From the point of view of the program, inside the digital processing chip 6, there are thus two audio sources and two sinks. One source is the signal from the microphone M of the handset at 22 in FIG. 1, following the path through codec 11 into the later-referenced high speed serial port HSP of the DSP chip 6, shown at the "SIGNAL FROM MICROPHONE" line M' in FIG. 2, feeding the upper talking path unit 13. The other source is the incoming signal from the line $L_1$, FIG. 1, through line buffer 5 and codec 9 into the HSP port of the DSP chip 6 at the point represented at "SIGNAL FROM PHONE LINE" 24 in FIG. 2. The sinks are the earphone of the headset H and the outgoing signal on the line. The latter originates at the upper line 20 from the lower talking path unit 13 and the SRS signal generator 2 at the "SIGNAL TO PHONE LINE" of the DSP chip 6, FIG. 2, applied to the codec 9, FIG. 1, and through line buffer 5 to the line $L_1$. The signal originating at the lower talking path 13 along the lower line H' therefrom at the "SIGNAL TO EARPHONE" region, is fed out from the HSP port of the DSP chip 6 through codec 11 of FIG. 1 to the earphones H of the headset.

The port 26 of the DSP chip 6 is the RS232 port, connected through a line amplifier buffer chip 3, precisely in the same fashion as an ordinary analog modem for connecting to a computer, although extended services may also be provided through this port as later described. In connection with the before-described DSP chip very high speed serial path HSP, this is designed to interface to a number of kinds of chips including, for example, the before-mentioned codecs, connecting to both the input and the output in a high speed serial path, with the codecs providing an A-to-D and a D-to-A conversion.

The lower codec 11 is thus shown connected to both the headset H and the microphone M. The upper codec 9 is connected through buffer 5 to the phone line $L_1$ from the telephone exchange. Through the port $L_2$, for example, a conventional analog FAX machine or answering machine may be connected in a smooth fashion; that is, when appropriate signals are recognized in the DSP chip 6, such activates the by-pass switch 12, FIG. 1, to allow the signal in the line $L_1$ to connect directly to the port $L_2$, by-passing the system. The system described herein, therefore, is sufficient for providing all the different features before discussed with proper programming and without the necessity for major additional hardware.

The program consists of two portions. The first is signal processing running repeatedly in time at a particular digital sample rate consistent with the Nyquist theorem, typically 8000 times per second (executions). This signal processing module has the two basic inputs of the phone and the microphone and two outputs which are basically the phone line and earphone as previously traced. Within the signal processing module there are a number of different program segments that are being executed—different ones at different times, including the before-mentioned simulating of the operation of analog filters. Classically analog filters are made up with capacitors and inductors and resistors and they can be configured in a number of forms. With the digital signal processing module 6, the effect of different filters can be simulated in a dynamic kind of arrangement. Basically, there is the main signal flow in order that conversation can occur on the phone; namely, reading the inputs applied through input buffer 5 from phone line $L_1$, applying filters to the input signals, mixing the signal coming from the microphone M with some appropriate portion of side tone. The talking path maintenance module 13, FIG. 2, supports the conversation function by appropriately interconnecting the line $L_1$ and the headset H as earlier traced. Also in the audio rate loop of the DSP chip 6, FIG. 2, is the modem recognition module 14 which automatically recognizes to which international standard an applied modem signal conforms. Once recognized, modem implementation modules 15 exchange data in conformance with appropriate international standards as later described. The talking path maintenance module 13 can operate either in a fully conventional mode or with the data "under-voice" mode where the data signal is filtered out. Such modules would implement international standards such as V.22 (1200 baud bidirectionally), V.22 bis (2400 baud), V.29 (9600 baud as for FAX machines), and V.32 (9600 baud bidirectionally as for interactive computers) as described, for example, in International Telecommunication Union Red Book "Data Communication Over the Telephone Network", Geneva 1945, pages 64–93, 203–214 and 221–238.

FIG. 2, as previously noted, illustrates the SRS recognition module 4 which consists of an elaborate set of recognition and conditioning filters chosen to match the selected SRS signal and discriminated with a high degree of reliability from other possible signals such as voice, modem signals, etc.

There is also the control aspect of the system in addition to the signal processing aspect and there exists an implementation choice as to whether to implement the control section in a completely separate single chip computer, such as an Intel 8751, well-designed to do this, or to avoid that separate chip altogether and implement it by means of interrupt routines that would be running on the DSP chip 6 itself.

The configuration set-up function allows the user to specify what mode of operation is desired and what external equipment is connected. The LCD display function selects data to appear upon the LCD 8. For example, as one dials the number, it would appear on the LCD for the user to see; and if nothing else is going on, it might just as well display the date and time. If in the middle of a call it is recognized that the user is on the SRS-equipped phone, any message which has been received from the far end can be displayed on the display.

The RS 232 section, FIG. 1, interfacing through the line buffer 3 and supplemented by the G-Bus controller lines 13' can operate in several modes, depending upon the selected configuration. The G-Bus consists of the RS232 interface plus additional controller lines 13' that can connect with a wide variety of external devices (printer, authentication module, multiple computer interfaces and interfaces to consumer devices) which proceed to function smoothly because of the provisions for automatically notifying the remote party of their existence and characteristics. The simplest is to serve as a conventional computer modem at some particular baud rate.

The SRS signal generator 2, FIG. 2 when activated by the control logic plays out onto the line $L_1$ an SRS signal of appropriate form, via line 20, as before described. Each such SRS signal defines a time zero situation for the initiation of a particular protocol, underlying the smooth operation at the heart of the present invention.

The first step of a call, of course, is going to be the user pick up of the phone and the switch hook activation at 16, FIG. 1. The switch hook is shown interfaced by means of an I/0 pin A at the DSP module 6, and by means of conventional operation, the call is processed through the stages of obtaining dial tone and dialing the desired number into the central exchange, as is well known.

The user thus dials a number, the remote phone exchange does its normal operation and at some point it completes the call. When the called party at $SP_2$ lifts the switch hook at that phone, the SRS generator 2 at that phone is activated and sends an SRS distinctive "bong" to the calling phone $SP_1$. This is detected by the SRS recognition filter 4 at the phone $SP_1$ which replies with its SRS reply "bong" via its SRS signal generator 2. This, in turn, is detected by the SRS recognition circuit 4 at phone $SP_2$. Since these two phones are now aware of the fact that they are both SRS-equipped phones, etc., operation may proceed in a data "under voice" mode. Thus, the users may carry on their conversation, while meanwhile the exchange of data signals under the control of the respective DSP chips occurs, transparent or imperceptible to the users. In particular, SRS phone protocol may be initiated by which the phones advise each other of their available respective configurations, display sizes, printers and other external devices and other capabilities.

As an example, a patient calls the doctor's office using the usual telephone number and procedure. Immediately as the phones are answered, both the receptionist and the calling patient are advised of the existence of SRS services by the SRS "bong" and reply "bong". Once the patient's appointment is arranged and the date and time thereof entered by the receptionist on her computer, this would automatically appear on the patient's LCD display 8. Moreover, the receptionist's computer would be automatically advised if a printer is available on the patient's SRS telephone, and, if so, will print out the appropriate appointment slip automatically on the patient's printer. This system can interface naturally with an automated calendar system that the patient might maintain, and which can enable later cancellation or modification without human intervention. The invention thus introduces the possibility for smooth multiparty automatic calendar updating or similar functions.

The data "under voice" mode of operation represents a base mode from which transitions into any of several pure digital modes are possible. Such digital modes allow data to be sent much faster—typically 9600 or more baud, by temporarily interrupting the voice path. While during such transmission, the analog voice signal may not be available, it may be restored when the transmission is complete.

The invention, in all events, provides for automatic configuring and well beyond what has been done before, with a cornerstone of the SRS signal concept and appropriate protocols and configurations. Ultimately, the invention provides the user with a multi-function device that provides some functionality which has been conventionally available, such as a modem, etc., and also some functionality which is new, such as allowing an LCD to be updated for the user at the same time as the call is in progress. Based on this, the invention has opened the door to a whole series of other progressions, including simultaneous transparent data exchange and demultiplexing as in causing the LCD and a printer to all work together and to function smoothly.

As before stated, the invention can also be employed in connection with an ISDN telephone exchange as well as the conventional exchanges. For example, the invention may be used in a standard ISDN reference point or interface 5, FIG. 3, described, for example, in the Geneva 1985 International Telecommunication Union publication Integrated Services Digital Network (ISDN), commencing at page 128 (Standard I 411). This standard interface 5 specifies that audio information is transferred by means of a so-called B channel of, labelled "ISDN DIGITAL B CHANNEL", of 8000 bytes/second or 64K bits/second (64 KB). In the SRS-equipped ISDN vesion of FIG. 3, this digital signal is introduced to the HSP port of the DSP chip 6, FIG. 1, instead of the codec 9. This allows the audio rate loop of the DSP chip 6, FIG. 1, to function as before described. Some additional functionality is, however, made possible by the capabilities of the ISDN telephone interface. Within the ISDN network there exist limited capabilities for matching certain characteristics of the calling and called telephones. These can be significantly extended by means of the SRS concept of the present invention. Phone connections that are not wholly contained within the ISDN network receive no benefit from any ISDN matching features. The SRS technique overcomes this by operating smoothly with SRS telephone and has the additional feature of advising the users.

Certain features for determining the characteristics of the digital path are provided by this ISDN standard, but these are effective only for calls within the ISDN network; they do not inform users on the line; and, in many cases, they operate so as to deny service if the channel is not of a particular type, as opposed to adapting smoothly to the characteristics of the channel which is available; and existing telephone company tariffs and procedures do not envision the possibility of providing data and voice simultaneously to a single number—but the invention solves all these problems, including obviating the necessity for any revising of telephone company procedures.

It is desirable for the SRS-equipped system to be able to automatically determine that the call has been completed within the ISDN network, if in fact that is the case. This is accomplished by a so-called SRS-ISDN digital signal, the first part of which is exactly the SRS in digitized form. Following that, however, is a "digital signature", consisting of just a few bytes containing some sharp transitions. After the SRS has been recognized, the DSP chip 6 examines the digital data just following the now-identified SRS for the exact digital signature. If the digital signature is found, it means the call has been completed by a fully digital (i.e. ISDN) path. If analog processing has been involved at any stage of the call path, the digital signal will be corrupted (since it represents frequency components well beyond the normal telephone bandwidth), and the system will operate in the analog SRS mode.

If the existence of a digital path has been detected, the logical operation of the SRS protocol (configuration communications, demultiplexing, etc.) is not affected; however, improved data rate is easily possible (the before-mentioned B channel having the said basic data rate of 64 KB). Probably, however, some form of "modulation" would still be used to minimize the error rate (although error recovery and retransmission would also be provided at the SRS protocol level, as usual). The problem of separating voice, data, and control information would also be simplified by the digital nature of the connection, although a particular protocol would still be necessary. 64 KB is a fairly generous rate for speech transmission. Thus, it is fairly straightforward to split off a little for the "data under voice" function. One very simple method would be to reserve a particular codeword (say all "ones") to indicate the following codeword is part of the data stream; the voice signal would simply be interpolated (averaged) across the gap thus produced. Another method would be to use the low order bit (or bits, etc.) of each eight-bit codeword for data stream purposes. The dynamic range represented by the remaining seven bits is quite sufficient for highly acceptable speech reproduction.

Turning to FIG. 3, the manner in which the DSP chip 6 of FIG. 2 would be interfaced to the before-described ISDN terminal equipment is generically shown at 20. As previously discussed, the ISDN Digital B channel contains the digital data sent over the phone line inserted at the HSP port of the DSP chip 6, FIG. 1, in place of the codec 9. In this implementation, the ISDN logic is responsible for initiating calls and other call progress functions, while the DSP chip 6 serves to detect SRS signals and to interface on equipment characteristics as previously explained.

Further modifications will occur to those skilled in this art and such are considered to fall within the spirit and scope of the invention as defined in the appended claims.

What is claimed is:

1. A method of voice and simultaneous user-imperceptable digital data communication between a pair of telephones connectable through a telephone exchange that comprises, providing each telephone with digital processing equipment for cooperation therebetween; programming the processing automatically to transmit a distinctive audio recognition signal from the receiving telephone when connected to the calling telephone and from the calling telephone back to the receiving telephone to indicate to the users that both phones are specially equpped for cooperation; and in which said recognition signal is transmitted between the calling and receiving telephone digital processing equipments to alert that the phones are specially equpped for cooperation between their respective digital processing equipments; and in which the digital data originating from the programming in at least one of the telephone processing equipments is digitally transmitted therefrom in a manner imperceptible to the telephone users and during their continued voice conversation.

2. A method as claimed in claim 1 and in which said digital processing equipments automatically alert one another as to respective auxiliary equipment at each phone for such data transmission and its reception, said auxiliary equipment being digital apparatus, printers, computers and microprocessors, and answering machines, available at the respective phones for automatic data exchange between the telephones.

3. A method as claimed in claim 2 and in which each telephone is provided with visual digital display capability and the further step is performed of causing the visual display of the calling telephone first to display the called telephone number and subsequently to display digital data originating from the programming in the receiving telephone processing and digitally transmitted therefrom in a manner imperceptible to the telephone users and during their continued voice conversation.

4. A method as claimed in claim 3 and in which information from said auxiliary equipment is transmitted for display on the said visual display at the telephones.

5. A method as claimed in claim 1 and in which the data transmissions are multiplexed to permit display and auxiliary equipment operation.

6. A method as claimed in claim 2 and in which said telephone exchange is of the ISDN type and said processing is interacted with channel signal information fed from the ISDN network to provide adaptability for flexible functions with telephones outside the ISDN network, informing users on the line of said specially equipped status for cooperation; and automatically alerting the processing at the telephones as to respective available auxiliary equipment at each telephone for data transmission and reception and enabling smooth adaptation for such auxiliary equipment interaction.

7. Apparatus for combining voice communication simultaneously with digital alpha-numeric data transmission and reception between a pair of telephones connected with a telephone exchange having, in combination, cooperative digital signal processing means and alpha-numeric display means provided at each telephone; means for generating a distinctive recognition signal at each telephone indicative of the existence of said digital processing and display capability and comprising a distinctive time-varying audio signal within the frequency band of the audio communication and audible to the users and also automatically recognizable by the respective digital signal processing means; means controlled by the processing means of the processing means for causing the call-receiving telephone automatically to transmit said recognition signal upon the calling telephone user dialing and the receiving telephone user picking up telephone; means for thereupon causing the calling telephone to transmit its recognition signal so that both the calling and receiving users and the respective digital signal processing means at each telephone are aware of said capability at both telephones and are ready to exchange digital signals; and means controlled by the digital signal processing means for causing the exchange of digital signal data between the pair of telephones simultaneously with the voice communication and imperceptible to the telephone users and without interference with the voice communication.

8. Apparatus as claimed in claim 7 and in which said digital processing means transmits digital signal data information identifying the auxiliary equipment present at each telephone.

9. Apparatus as claimed in claim 8 and in which means is provided for displaying equipment information on said display means.

10. Apparatus as claimed in claim 7 and in which there is provided means controlled by the processing means for providing modem capability at varied baud rates while further integrating, controlling and interfacing automatically with a bus connected with auxiliary devices.

11. Apparatus as claimed in claim 10 and in which means is provided for displaying the called telephone number on said display means at the calling telephone followed by automatic display of subsequent information from the digital processing means of the called telephone as desired, all transparent to the users and during their continued conversation.

12. Apparatus as claimed in claim 7 and in which said recognition signal is in digital form and is followed by bytes representing a digital signature, and means is provided, following recognition of the recognition signal for identifying the digital signature either to enable operation in a fully digital path, or if not present to operate the system in analog mode.

13. Apparatus for combining voice communication simultaneously with digital alpha-numeric data transmission and reception between a pair of telephones connected with a telephone exchange having, in combination, cooperative digital signal processing means provided at each telephone provided with means for generating a distinctive recognition signal at each telephone for transmission to the other that indicates the existence of said digital processing capability and comprising a distinctive time-varying audio signal within the frequency band of the audio communication and audible to the users and also automatically recognizable by the respective digital signal processing means.

14. Apparatus as claimed in claim 13 and in which means is provided at the called telephone, upon pick-up, for generating said distinctive recognition signal and transmitting to the calling phone, and means at the calling phone for generating a distinctive recognition signal and transmitting to the called telephone.

15. Apparatus as claimed in claim 14 and in which there is provided means controlled by the digital signal processing means for causing the exchange of digital signal data between the pair of telephones simultaneously with the voice communication and imperceptible to the telephone users and without interference with the voice communication.

16. Apparatus as claimed in claim 15 and in which said telephone exchange is of the type ISDN and means is provided for connecting said telephone digital signal processing means to receive digital channel signals therefrom, said processing means providing the ISDN exchange with the capability for adaptability for multifunctions with telephones outside the ISDN network, informing users on the line of the specially equipped status of the telephones for cooperation, and automatically alerting the signal processing means at the respective telephones identifying available auxiliary equipment at each telephone for data transmission and reception, and enabling smooth adaptation for such auxiliary equipment interaction.

* * * * *